(12) United States Patent
Stange

(10) Patent No.: US 7,028,558 B2
(45) Date of Patent: Apr. 18, 2006

(54) METHOD FOR MEASURING A MEDIUM THAT FLOWS THROUGH A MEASURING TUBE

(75) Inventor: Gerd Stange, Nortorf (DE)

(73) Assignee: Fachhochschule Kiel, Kiel (DE)

(*) Notice: Subject to any disclaimer, the term of this patent is extended or adjusted under 35 U.S.C. 154(b) by 181 days.

(21) Appl. No.: 10/484,223
(22) PCT Filed: Apr. 25, 2003
(86) PCT No.: PCT/DE03/01375
§ 371 (c)(1), (2), (4) Date: Jan. 16, 2004
(87) PCT Pub. No.: WO03/098164
PCT Pub. Date: Nov. 27, 2003

(65) Prior Publication Data
US 2004/0154409 A1 Aug. 12, 2004

(30) Foreign Application Priority Data
May 16, 2002 (DE) .......... 102 21 677

(51) Int. Cl.
G01F 1/58 (2006.01)

(52) U.S. Cl. .......... 73/861.12
(58) Field of Classification Search .......... 73/861.12, 73/861.15
See application file for complete search history.

(56) References Cited

U.S. PATENT DOCUMENTS

| | | | | | |
|---|---|---|---|---|---|
| 4,592,240 A | * | 6/1986 | McHale et al. | .......... | 73/861.22 |
| 4,658,652 A | * | 4/1987 | Picone et al. | .......... | 73/861.12 |
| 4,839,581 A | * | 6/1989 | Peterson, Jr. | .......... | 324/72 |
| 5,269,191 A | * | 12/1993 | Wada | .......... | 73/861.12 |
| 6,708,569 B1 | * | 3/2004 | Budmiger | .......... | 73/861.12 |

FOREIGN PATENT DOCUMENTS

DE 10049781 A1 4/2002

* cited by examiner

Primary Examiner—Edward Lefkowitz
Assistant Examiner—Jewel V. Thompson
(74) Attorney, Agent, or Firm—Larson & Larson, PA; Herbert W. Larson

(57) ABSTRACT

A method for measuring a flow rate of a medium through a measuring tube which is penetrated by a constant magnetic field orthogonal to a flow direction and in which an electrical voltage building up in the medium is sensed by electrodes, insulted with respect to the medium and located on an outer wall of the measuring tube in a plane orthogonal to the flow direction of the medium, in which the capacitance of at least one capacitive unit is formed by the electrodes, and a measuring tube interior area and a charge change brought about by a change to the at least one capacitive is determined, and from this a voltage is established which is determinative of the flow rate of the medium through the measuring tube.

8 Claims, 1 Drawing Sheet

METHOD FOR MEASURING A MEDIUM THAT FLOWS THROUGH A MEASURING TUBE

PRIOR APPLICATIONS

This application bases priority on International Application No. PCT/DE03/01375, filed Apr. 25, 2003, which in turn bases priority on German Application No. DE 102 21 677.0, filed May 16, 2002.

BACKGROUND OF THE INVENTION

1. Field of the Invention

The invention relates to a method for measuring the flow rate of a medium flowing through a measuring tube and which is penetrated by a constant magnetic field positioned orthogonally to the flow direction, in which the electrical voltage building up in the medium is sensed by electrodes located in the plane of the magnetic field and externally on the electrically insulating wall of the measuring tube.

2. Description of the Prior Art

It is known to establish the flow of a medium through a measuring tube by capacitive measurement of the electrical voltage building up in the medium (Helmut Brockhaus, Magnetoinductive Flow Measurement with Capacitive Methods, in the Journal TM—Technisches Messen, 64, 1997, 5, Oldenbourg Verlag, Munich).

For practical reasons there is a considerable need for a measuring system combining the advantages of capacitive coupling out with those of a permanent magnetic excitation, the latter being the minuscule power requirement for building up the magnetic field. Such a system would also be particularly suitable for micromechanical implementation.

Rudimentary solutions have been proposed in DE 198 31 491 A1 and DE 100 49 781 A1. However, following extensive testing it has been found that both proposals require galvanic auxiliary electrodes. The galvanic potentials associated therewith cannot be completely eliminated when applying or using time-constant magnetic fields without working with complicated electrochemical reference electrodes which are problematical in practical use.

Therefore, the problem of the invention is to provide a flow measurement method working with low energy costs.

SUMMARY OF THE INVENTION

According to the invention, for the capacitive coupling out of the measuring signal UO proportional to the flow rate of the flow medium, an electrically insulating measuring tube penetrated by a static magnetic field of induction B is equipped with coupling out electrodes applied externally and with the tube interior in each case forming a capacitive unit. The capacitance of at least one of these capacitive units is variable by a control device. The charge change caused by the capacitance change is inter alia dependent on the voltage induced in the interior of the measuring tube by interaction of the speed of the flowing medium with the magnetic field of the induction. By means of a measuring and evaluating device linked with the capacitive units and the control device, conclusions can be drawn regarding this useful voltage UO and finally, using known methods, the flow rate of the flowing medium. The tube walls form at least part of the dielectric.

In principle, the method according to the invention provides for a large number of solutions concerning the technical implementation of the capacitance change. In an exemplified variant the capacitance change is brought about by mechanical measures. For this purpose the coupling out electrodes can e.g. be positioned in such a way that their spacing with respect to the inner wall of the measuring tube is variable. The spacing control can e.g. take place by magnetic influencing or by piezoelectric systems.

However, rotary arrangements are also conceivable. In this case, e.g. through sector wise differing dielectric or geometric conditions on a rotary circular disk, the effective coupling out capacitance is changed when the particular sectors pass over the coupling out area.

A non-mechanical variant is constituted by electronic capacitance control using semiconductor layers in the coupling out zone, in that there is a virtually wattless or nondissipative operation thereof at different control voltages applied in the inverse direction using the principle known from the varactor diode, so that different capacitance values arise.

Particularly promising is the use of ferroelectric layers of limited thickness as the dielectric in capacitors, whose permittivity can be varied within wide limits by the application of a control voltage. Jointly with the use of a permanent magnet for producing the magnetic field, this solution is ideally adapted to the manufacturing possibilities of micromechanical systems, because ferroelectrics with layer thicknesses of a few micrometers are sufficient. This makes it possible to implement flow sensors with very small dimensions, such as are of interest in many fields, e.g. in medicine and the chemical industry.

The method according to the invention offers numerous possibilities with regards to the time variation of the capacitance change. In addition to non-periodic switching operation it is possible to have periodic operating modes, e.g. with sinusoidal or square-wave or pulse behavior, the period time being easily adaptable to the measuring requirements.

The method according to the invention also offers numerous possibilities with regards to signal evaluation and details thereof are naturally dependent on the nature of the technical implementation of the capacitance change. On the one hand the charge change can be directly measured at the varied capacitance, in that the latter is directly connected to a change amplifier, such as is known from piezoelectric measurement technology. On the other, preferably in periodic operation, the current occurring as a result of the load change or the voltage drop corresponding thereto can be evaluated at a resistor in a closed measuring circuit, optionally following suitable amplification.

Thus, in summarizing, the invention indicates the way to solving a problem hitherto considered insoluble of extending the principle of magnetoinductive flow sensors to the use of static magnetic fields and at the same time permitting the utilization of the known advantages of capacitive signal coupling out. Particular mention is made of the fact that with permanent magnets from the group of rare earths, it is possible to produce extremely high magnetic fields with minimum constructional volumes, such as cannot be achieved with electrically excited systems. As the induced useful signal is proportional to the induction, this advantage directly aids the level of the measuring signal. In this way, it is possible to implement a magnetoinductive flow sensor, which can be operated with a minimum power requirement with maximum sensitivity, so as to provide excellent bases for mains-independent operation. Together with the known advantage of completely smooth inner walls of the measuring tube in the absence of mechanically moving parts within the measuring medium, it is thus possible to fulfill all the requirements concerning modern sensor means.

A particular advantage of the principle according to the invention is the possibility of microsystem implementation with hitherto unknown minimal dimensions in the mm range and below. This opens broad possibilities of use in medicine, environmental technology and industry.

DESCRIPTION OF THE DRAWINGS

Further features and advantages of the present invention can be gathered from the following descriptions of the preferred embodiment with reference to the attached drawing, wherein.

DETAILED DESCRIPTION OF THE PREFERRED EMBODIMENT

Figure 1:
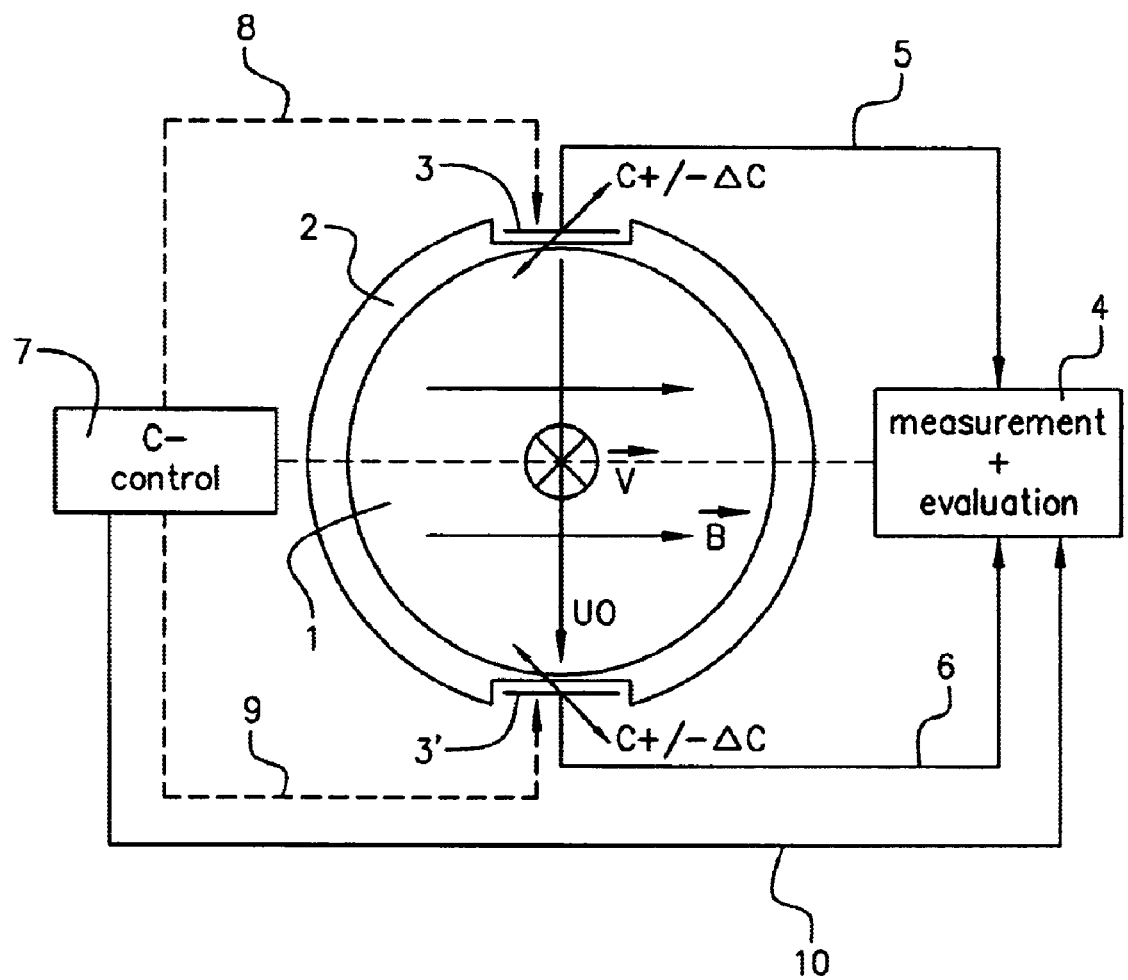
FIG. 1 shows a diagrammatic cross-section of the present invention through the measuring tube with the externally located coupling out electrodes with the control device used for modifying the same and the measuring and evaluating device connected thereto.

On an axis orthogonal to the magnetic field lines designated B in the drawing are provided coupling out electrodes 3, 3' positioned outside the electrically insulating measuring tube 2, whereof the size of at least one can be modified by the control device 7 connected thereto (indicated by a sloping double arrow). Together with the tube interior the coupling out electrodes form capacitive units, which are used for coupling out the voltage UO induced in the interior 1 of the measuring tube 2 as a result of the interaction between the flow rate v and magnetic field B, in that the charge change occurring as a consequence of a capacitance change of the capacitive units is established in a measuring and evaluating device 4 connected by means of connections 5, 6, whereby from the same the useful voltage UO is determined and finally, using known laws, the flow rate is established therefrom.

The following explanations serve in exemplified manner only for deriving the relationships between a capacitance change from C to C+ΔC and the charge change caused by the same, as well as the time behavior of the current i and voltage UR observed in the measuring and evaluating unit 4, where the latter in the simplest conceivable case merely comprises a series resistor R inserted in the connecting leads 5, 6 and UR stands for the voltage falling thereon.

Using as a basis the state of equilibrium characterized by the same voltage of in each case UO/2 at the identical output capacitances C (3, 3'), then as a result of the sudden bilateral increase of C to C+ΔC, the charge $$\Delta Q = 2\Delta C \cdot UO/2 = \Delta C \cdot UO$$

flows in the measuring circuit, which in closed circuit across the resistor R leads to the flow $$i = \frac{1}{RC}\Delta C \cdot UO \cdot e^{-\frac{1}{RC}}$$

and therefore supplies the voltage drop $$U_R = \frac{\Delta C}{C} \cdot UO \cdot e^{-\frac{1}{RC}}$$

to R.

In the case of a sinusoidal capacitance change with the angular frequency ω the voltage drop $$U_R = \frac{\Delta C}{C} \cdot UO \cdot \sin\omega t$$

occurs, for as long as the reciprocal of the time constant RC can be assumed as large compared with the angular frequency ω.

This simple observation makes clear the mechanism of the coupling out of the useful voltage UO through the parametric change of the coupling out capacitors. With possible relative capacitance changes ΔC/C>1, it is even possible to implement an amplification without using external amplifiers, even though this possibility always additionally exists.

The method according to the invention provides a large number of alternative control and evaluation possibilities and the preceding simple observation merely serves to explain the fundamental implementation of the idea according to the invention.

What is claimed is:

1. A method for measuring a flow rate of a medium flowing through a measuring tube which is penetrated by a constant magnetic field orthogonal to a flow direction and which an electrical voltage building up in the medium is sensed by electrodes insulated with respect to the medium and located on an outer wall of the measuring tube and in a plane orthogonal to the flow direction of the medium, the measuring tube having an interior area in which the medium is flowing, the measuring tube having an interior area and a position of the electrodes on the outer wall of the measuring tube defining a space therebetween, the steps of the method comprising:

a) determining a capacitance of at least one capacitive unit formed by the electrodes and the measuring tube interior area, b) determining a charge change in a static magnetic field created by a change to the at least one capacitive unit by modifying a distance between the electrodes and the measuring tube interior area, and c) establishing a voltage indicative of flow rates.

2. The method according to claim 1, wherein mechanical energy is employed in the step of modifying a distance between the electrodes and the measuring tube interior area.

3. The method according to claim 1, wherein magnetic energy is employed in the step of modifying a distance between the electrodes and the measuring tube interior area.

4. The method according to claim 1, wherein a piezoelectric effect is employed in the step of modifying a distance between the electrodes and the measuring tube interior area.

5. The method according to claim 1, further comprising the steps of:

a) determining a measured value for a charging current flowing relative to modifying the capacitance of the at least one capacitive unit, and b) establishing an induced voltage which is determinative of the flow rate of medium through the measuring tube.

6. A method for measuring a flow rate of a medium flowing through a measuring tube which is penetrated by a constant magnetic field orthogonal to a flow direction and in which an electrical voltage building up in the medium is sensed by electrodes insulated with respect to the medium and located on an outer wall of the measuring tube and in a plane orthogonal to the flow direction of the medium, the measuring tube having an interior area in which the medium is flowing, the measuring tube interior area and a position of the electrodes on the outer wall of the measuring tube defining a space therebetween, the steps of the method comprising:

a) determining a capacitance of at least one capacitive unit formed by the electrodes and the measuring tube interior area, b) determining a charge change in a static magnetic field created by a change to the at least one capacitive unit by modifying a permittivity of a material disposed within the space defined by the measuring tube interior area and the position of the electrodes on the outer wall of the measuring tube, and c) establishing a voltage indicative of flow rates.

7. The method according to claim 6, wherein the material disposed within the space is a semiconductor material having a permittivity dependent on a voltage applied thereto in an inverse direction.

8. The method according to claim 6, wherein the material disposed within the space is a ferroelectric material having a permittivity dependent on a control voltage applied thereto.

* * * * *